May 15, 1962 KARL-HEINZ HENNENBERGER ETAL 3,034,776
ROTARY FURNACE

Filed Aug. 18, 1955 4 Sheets-Sheet 1

Inventors:
Karl-Heinz Hennenberger
Georg T. Heilig
By Bailey, Stephens & Huettig
ATTORNEYS May 15, 1962 KARL-HEINZ HENNENBERGER ETAL 3,034,776
ROTARY FURNACE
Filed Aug. 18, 1955 4 Sheets-Sheet 3

Inventors:
Karl-Heinz Hennenberge
Georg T. Heitig
By Bailey, Stephens & Huettig
ATTORNEYS Inventors:
Karl-Heinz Hennenberger
Georg T. Heilig
By Bailey, Stephens & Huettig
ATTORNEYS United States Patent Office 3,034,776
Patented May 15, 1962

3,034,776
ROTARY FURNACE
Karl-Heinz Hennenberger, Mannheim Neu-Ost, and Georg T. Heilig, Mannheim-Rheinau, Germany, assignors to Lurgi Gesellschaft für Chemie und Hüttenwesen mit beschränkter Haftung, Frankfurt am Main, Germany
Filed Aug. 18, 1955, Ser. No. 529,283
Claims priority, application Germany Feb. 8, 1952
4 Claims. (Cl. 263—33)

The present invention relates to a rotary furnace of improved construction and more particularly relates to improvements in a rotary tube furnace adapted to treat materials in a fused state.

Rotary tube furnaces are used for many types of reactions or treatments of materials in the solid or semi-solid state, especially at high temperatures. On the other hand, treatments or reactions in which the materials treated or reacted are in the fused state in rotary tube furnaces engender difficulties, as the molten materials often not only attack the furnace linings thermally but also chemically so that the linings must be renewed after only relatively short periods of time. Some melts are so highly aggressive that no refractory furnace lining having an economically feasible life had previously been found therefor. For example, even the best refractory materials, such as, chrome-magnesite bricks or corundum bricks have a life of only a few hours when in contact with alkali metal phosphate melts.

It has already been proposed to cool the furnace shell by providing an external water jacket or by spraying the shell with water in order to protect the furnace lining to some extent against thermal stresses. While these measures served to increase the life of the lining in instances where relatively non-aggressive melts were involved, such measures were of little avail in protecting the lining against thermal attack by the melts.

In accordance with the invention it has been found that reactions or treatments of molten materials could be satisfactorily carried out in internally heated rotary furnaces without undue attack upon the apparatus, if the treatment is carried out under such conditions that the refractory lining of the furnace shell is formed in situ of the solidified melt treated or reacted rather than a refractory lining composed of refractory material foreign to the materials treated or reacted. As the lining according to the invention which is formed in situ by solidification of the materials treated and reacted is of the same composition as such materials, it is completely inert with respect to the molten materials in the furnace. The lining which in accordance with the invention is formed in situ of the molten materials treated or reacted within the furnace must, in order to provide a dependable protection for the furnace shell, be strongly cohesive, must not collapse or flake off during the operation of the furnace and must in addition adhere firmly to the inner surface of the furnace proper.

In accordance with the invention it was found that in order to achieve a lining of solidified melt which meets such requirements, it is in the first place necessary to provide a good heat transfer between the cooling surface upon which the melt solidifies to form the lining and the molten charge in the furnace. If, for example, a simple unlined furnace is employed whose shell is cooled from outside by a water jacket, the lining formed by solidification of the molten material treated does not firmly adhere to the inner surface of the furnace shell and portions thereof spall off after a short time. The sudden strong overheating of the portions of the furnace shell which are bared lead to local steam formation, whereby the heat transfer is diminished and as the velocity of flow of the cooling water in the cooling jacket cannot be increased over a certain limit, the steam either is not or removed only so slowly that a new lining would not form over the bare spot at all or only so slowly that the furnace shell is practically ruined in the meantime. Substantially better results are achieved when the lining is formed in situ in the furnace by solidification of the melt with cooling tubes arranged in the interior of the furnace adjacent to the furnace shell through which a liquid cooling medium, preferably water, is passed. The heat transfer obtained with such cooling tubes is so improved that the solidified melt adheres firmly to the tubes and does not spall off therefrom. When the spacing between the cooling tubes is sufficiently small, the cooling area of the individual tubes overlap and the solidified masses which are formed thereon grow together to form a continuous furnace lining. In most instances a spacing of 50 cm. (about 20 inches) suffices. This also maintains the span of the self supporting coating sufficiently small that a possible collapse of the coating is avoided with certainty. In order to maintain a sufficiently high rate of flow of the water and to maintain the heat transfer sufficiently high, it is preferable not to use cooling tubes of too large a diameter. Tubes of a diameter of about 1.3 to 3.8 cm. (about 0.5 to 1.5 inches) have been found to be the most suitable as tubes of smaller diameters are too expensive and when tubes having a diameter of about 5 cm. (2 inches) are used steam formation cannot be prevented with certainty in an economically feasible manner as too much cooling water would have to be pumped therethrough. In order to increase the heat transfer to the cooling tubes as well as to ensure that such tubes are coated with a firmly adhering thick coating of the solidified melt, it is advantageous to space the cooling tubes a certain distance from the inner surface of the furnace wall rather than to fasten them directly in contact with such inner surface. The spacing between the inner surface of the furnace wall must be large enough that the formation of a solidified coating from the melt is not hindered on the side of the cooling tubes facing the furnace wall. On the other hand, the spacing cannot be too large as otherwise there would be the danger that the liquid melt would pass between the solidified coating of the cooling tubes and the furnace wall and prevent the formation of a firmly adhering solidified coating on the furnace wall. It was found that a spacing of 2–10 cm. (about .75 to 5 inches) between the wall of the cooling tubes and the inner furnace wall is generally optimal. For most melts it was found that a spacing of 5 cm. (2 inches) was most suitable when cooling tubes of a diameter of 2.5 cm. (1 inch) were employed.

The geometric arrangement of the cooling tubes was also found to be of importance. Cooling tubes which are parallel to the longitudinal axis of the furnace which meet the requirements set forth above will produce coatings of solidified melt which render operation of the furnace feasible. It was found however that more rigid and dependable coatings are obtained when the cooling tubes are arranged circumferentially and especially when the circumferentially disposed annular cooling tubes have a zig-zag configuration.

The accompanying drawings illustrate several modifications of the rotary furnace according to the invention. In such drawings.

Figure 5:
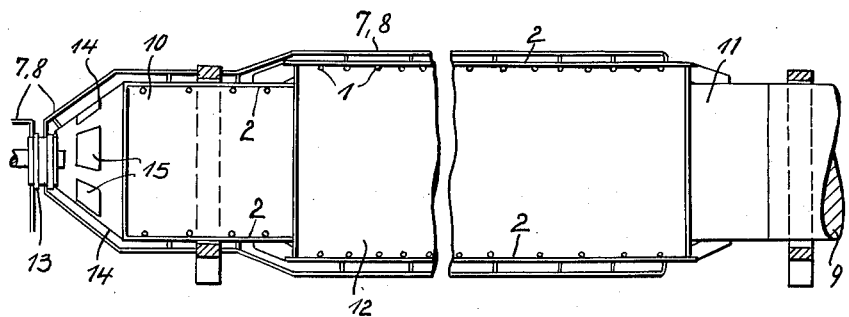
Figure 6:
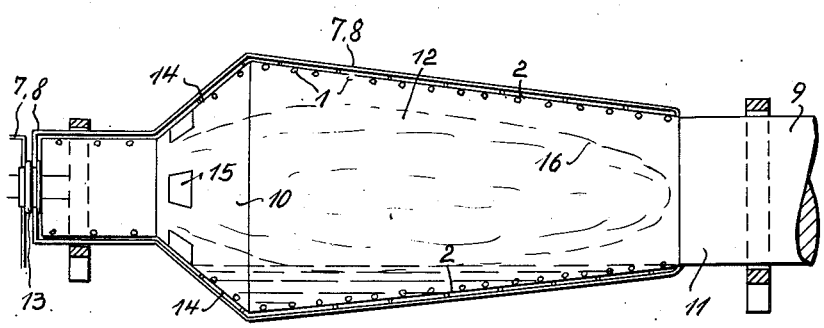
Figure 7:
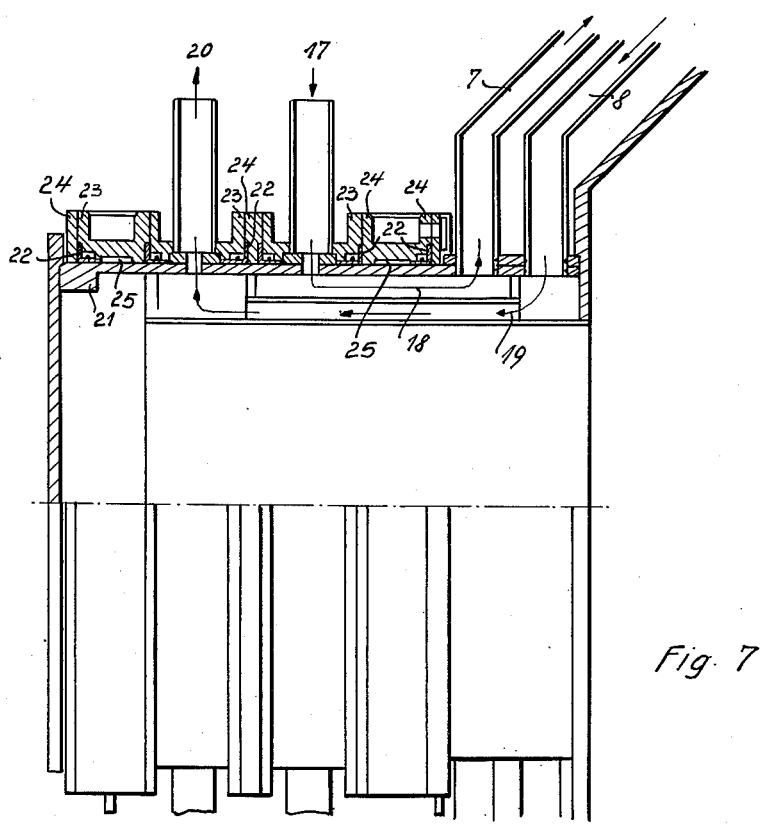

FIGURE 5 diagrammatically shows a longitudinal section through a furnace according to the invention;

FIGURE 6 diagrammatically shows a longitudinal section through a modified form of furnace according to the invention; and FIGURE 7 illustrates the stuffing box employed according to the invention for circulating the cooling medium through the cooling tubes provided in the rotary furnace according to the invention.

In the drawings, 1 represents the cooling tubes arranged along and spaced from the inner surface of the furnace shell 2 to provide the cooling necessary according to the invention to form the solidified protective coating of the molten furnace charge.

Figure 2:
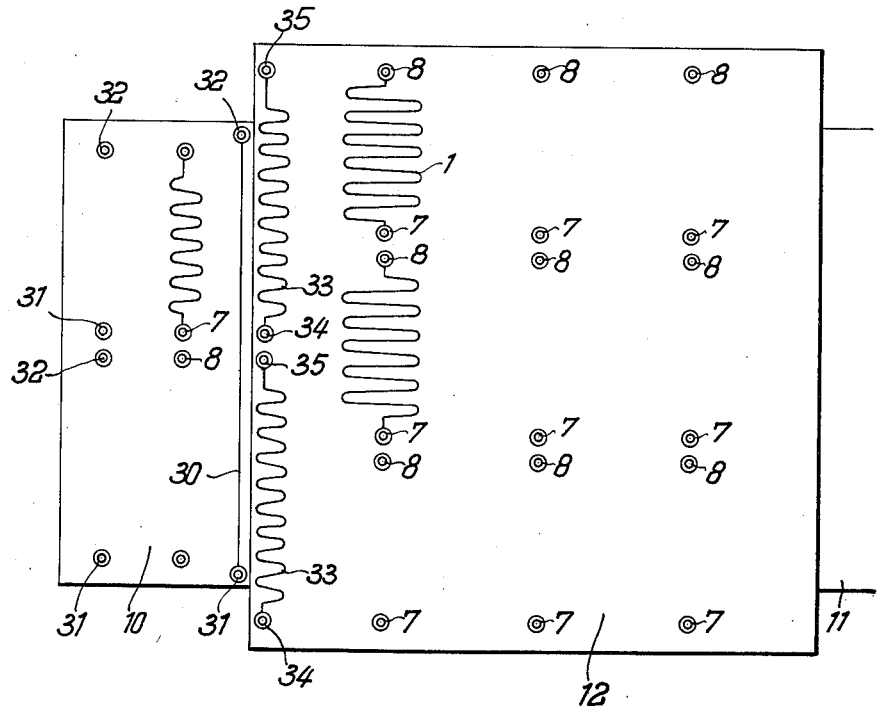
FIGURE 2 is a diagrammatic sketch of the furnace shell in flat projection illustrating the preferred geometric arrangement of the cooling tubes along the interior surface of the shell.

FIGURE 2 illustrates the preferred zig-zag configuration of cooling tubes 1 along the inner surface of furnace shell 2 and is a flat projection of the furnace shell of the furnace shown in FIGURE 5. 7 and 8, respectively, are the inlet and outlet tubes for the liquid cooling medium such as water. Such an arrangement effects such a solidification of the fused furnace charge in the individual cooling areas provided thereby, that a coating is produced having a practically unlimited life. An undulated cooling tube 30 is also provided as an edge protector. 31 an 32 are respectively the inlet and outlet tubes for such edge protecting cooling tube. A somewhat narrower undulated cooling tube 33 is provided in order to protect the face of the transition zone between the widened fusion zone 12 and the narrower discharge zone 10. Inlet and outlet tubes 34 and 35 are provided for such cooling tube 33.

Figure 3:
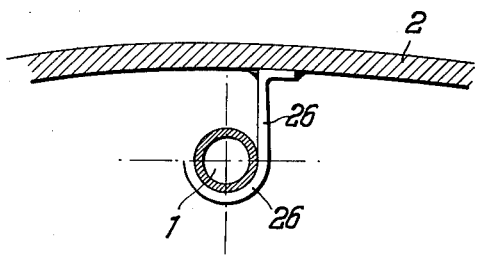
FIGURE 3 shows a section of a segment of the shell of a furnace according to the invention illustrating the preferred manner of fastening the cooling tubes to the shell.

The cooling tubes can be attached to the furnace shell with the desired spacing from the shell, for example, with clamping rings. In order to prevent undue mechanical strains on the tubes through heat engendered stresses it was found preferable, according to the invention, only to weld the clamping rings to the metal shell and not to the cooling tubes carried thereby so that the tubes can freely move longitudinally in such clamping rings. FIGURE 3 illustrates such an attachment of the cooling tubes. In such figure, 1 is the cooling tube, 2 the furnace shell and 26 the clamping ring.

In order to improve the heat transfer in the area between the cooling tubes, it has been found desirable according to a special modification of the invention to bridge the space between adjacent cooling tubes with metal wire nettings or parallelly stretched wires of good heat conductivity. While the additional strengthening of the solidified coating produced from the molten furnace charge achieved thereby, similar to the strengthening effect in reenforced concrete, is advantageous, the most important effect of providing the connecting wire networks or wires between the cooling tubes is the increased heat transfer achieved thereby in the area between the tubes and not the mechanical strengthening of the solidified coating formed thereover.

It was furthermore found desirable to provide the rotary tube furnace with a reaction chamber shaped so that the walls thereof substantially follow and are parallel to the contour of the heating flame so that all portions thereof are subject to the same amount of heat and an especially uniform protective solidified coating is produced from the fused furnace charge. To this end, the reaction chamber is shaped so that it has a conical first portion adjacent its discharge end converging steeply towards the discharge end and a second conical portion immediately adjacent said first conical portion which gradually converges in the opposite direction.

The cooling medium circulated through the cooling tubes is suitably supplied and withdrawn over a stuffing box. The stuffing box can be situated at either the charging or discharging end of the rotary tubular furnace but it can be of simpler construction if it is situated at the discharge end. Furthermore, when the discharge end of the furnace tapers sharply towards the discharge end, the stuffing box required is substantially smaller and its construction simpler and cheaper as it need not encompass the full furnace circumference but rather only the narrower portion thereof.

Before starting regular use of a furnace according to the invention, it is possible to fill the furnace with a melt obtained from another furnace already in operation so that the desired solidified protective coating is produced immediately in order to protect the cooling tubes from mechanical erosion from the unfused charge as well as thermal attack by the flame during the initial period of its first run. It is however simpler to fill the spaces between the cooling tubes after they, as well as any connecting wire nettings, have been installed in the furnace with a simple tamping mass to provide a break-in lining. This break-in lining protects the cooling tubes just long enough until a liquid melt is formed. The melt completely dissolves the break-in lining in a few hours to at most a few days and then such melt solidifies as the final desired firmly adherent protective coating on the cooling tubes and adjacent furnace shell. The break-in lining consequently does not have to be highly refractory nor be highly stable against chemical attack. For example, adhesive sand, bituminous shale, or ordinary hydraulic cement suffice for such break-in lining. It is, of course, self-evident that high grade refractories, such as, clinker-concrete (made of cement and cement clinkers), alumina cement or the like could also be used for the break-in lining.

Figure 4:
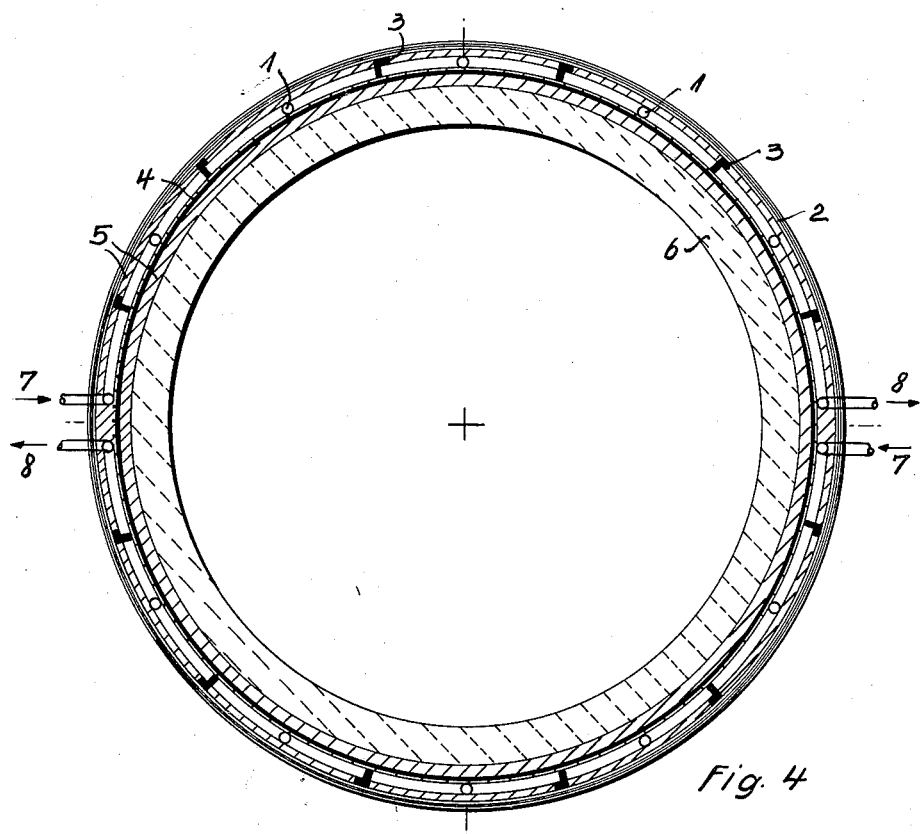
FIGURE 4 shows a vertical section through a furnace according to the invention at right angles to the longitudinal axis of the furnace.
Figure 1:
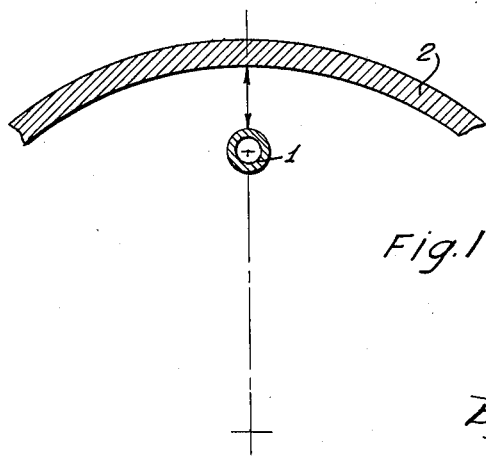
FIGURE 1 shows a section of a segment of the shell of a furnace according to the invention illustrating the spacing between the cooling tubes and the inner surface of the shell.

FIGURE 4 shows a cross-section of a furnace provided with such a break-in lining. In such figure, 1 is the cooling tubes, 2 the furnace shell, 4 the metal wire netting which is spaced 2 to 10 cm., preferably 5 cm., from the furnace shell by angle pieces 3. 5 is the break-in lining and 6 is the protective coating formed of the solidified melt. 7 is the cooling water inlet and 8 is the cooling water outlet.

FIGURE 5 shows a longitudinal section of a furnace according to the invention in which 1 is the cooling tubes, 2 is the furnace shell, 9 is the charging end and 10 is the discharging end. 11 is the preheating zone and 12 is the actual reaction zone. 13 is the stuffing box and 7 and 8 are respectively the inlet and outlet tubes for the cooling water for the individual cooling tubes. The converging wall 14 at the discharge end of the furnace, which is provided with discharge openings 15 renders it possible to construct the stuffing box 13 with substantially smaller dimensions than if it were necessary that it encompass the full width of the furnace.

Another design of the rotary furnace according to the invention is shown in FIGURE 6. In this design, the wall of the smelting or fusion zone substantially follows the shape of the heating flame so as to ensure the formation and maintenance of a substantially uniform protective coating of solidified melt over the entire length. In FIGURE 6, the furnace shell 2 has a conical first portion adjacent its discharge end which converges in the direction of the discharge end. A second conical portion joins the first conical portion and converges towards the charging end of the furnace at an angle less than the angle of the first portion. The converging conical portions of shells respectively extend substantially to the discharge and charging ends of the furnace. The reference numerals correspond with those in FIGURE 5.

The details of the stuffing box are shown in FIGURE 7. In order that its mode of operation be more easily understood, the stationary parts are hatched with hatching lines running downwardly from left to right and the rotating parts are hatched with hatching lines running downwardly from right to left. The cooling medium is introduced into chamber 18 through stationary tube 17 and enters the cooling water line 7 from such chamber. The cooling medium after having passed through the cooling tubes in the furnace is returned to chamber 19 in the stuffing box through line 8 and leaves the chamber through stationary tube 20. The stationary tubes 17 and 20 are sealed with respect to the rotary drum 21 of the stuffing box by sealing lips 22 which are pressed against the rotary drum 21 by angle pieces 23 and 24 which run on needle bearings 25.

Naturally if it is not desired to return the cooling medium after it has passed through the cooling tubes through the stuffing box, it can be permitted to run off free at the charging end of the furnace and the stuffing box construction can be correspondingly simplified.

In operation of the furnace according to the invention the velocity liquid cooling medium being passed through cooling tubes 1 within the furnace is maintained sufficiently high that no vapor or steam formation occurs in such cooling tubes. Surprisingly, it has been found that when water is used as a cooling medium the temperature of the water after passing through the cooling tubes can easily be maintained at about 30 to 50° C.

This application is a continuation-in-part of our application Serial No. 335,358, filed February 5, 1953, which is now abandoned.

We claim:

1. A rotary tube furnace adapted to treat materials in the molten phase comprising a rotary elongated tubular metallic shell, means for rotating said shell about its longitudinal axis, means for charging the material to be treated into one end of the shell, outlet means for discharging the treated material at the other end of said shell, means for heating the interior of the shell, a longitudinal section within said shell adapted to retain the molten material treated in said furnace, said shell having a conical first portion adjacent its discharge end, said first portion converging in the direction of the discharge end and a second conical portion joining said first conical portion, said second conical portion converging towards the charging end of the furnace at an angle less than in said first portion, the converging ends of said conical portions respectively extending substantially to the discharge and charging ends of the furnace, a cooling system within said shell comprising at least one cooling conduit arranged adjacent to the inner surface of said shell but spaced therefrom, said cooling system extending at least over the entire longitudinal section of said shell adapted to retain the molten material treated in said furnace, the exterior surfaces of said cooling conduit and the interior surface of the shell over which the cooling system extends being directly covered solely with a coherent protective layer of solidified material derived from the material treated in the molten phase in said furnace, means for supplying a cooling liquid to the cooling conduit to maintain said solidified protective layer in solidified condition, said means including a stuffing box.

2. A process for treating materials in the molten phase in a rotary tube furnace comprising a rotary elongated tubular metallic shell provided with cooling tubes distributed substantially uniformly adjacent to the inner surfaces of said metallic shell in the zone of the furnace adapted to retain the molten material to be treated but spaced from such inner surfaces which comprises covering said cooling tubes and inner surfaces of the metallic shell in the zone of the furnace adapted to retain the molten material to be treated with a break-in lining of non-refractive and non-chemically resistant material, introducing the material to be treated into such furnace, heating the interior of said furnace to melt the material introduced, simultaneously supplying a cooling medium to the cooling tubes, continuing the treatment of the molten material in the furnace while continuing to supply the cooling medium to the cooling tubes until the break-in lining has been removed and replaced by a coherent protective layer of solidified molten material being treated in the furnace directly covering the exterior surfaces of the cooling tubes and the entire inner surfaces of the metallic shell in said zone, the quantity of cooling medium supplied being sufficient to cause solidification of such layer of solidified molten material and continuing the treatment of the material in the molten phase in such furnace while supplying the cooling medium to the cooling tubes in a quantity sufficient to maintain said coherent protective layer of solidified molten material as the sole protective lining covering the exterior surfaces of the cooling tubes and the interior surfaces of the metallic shell.

3. A process according to claim 2 in which the cooling medium is supplied to the cooling tubes at at least such a quantity that it completely remains in the liquid phase.

4. A rotary tube furnace adapted to treat materials in the molten phase comprising a rotary elongated tubular metallic shell, means for rotating said shell about its longitudinal axis, means for charging the material to be treated into one end of the shell, outlet means for discharging the treated material at the other end of said shell, means for heating the interior of the shell, a longitudinal section within said shell adapted to retain the molten material treated in said furnace, said shell having a conical first portion adjacent its discharge end, said first portion converging in the direction of the discharge end and a second conical portion joining said first conical portion, said second conical portion converging towards the charging end of the furnace at an angle less than in said first portion, the converging ends of said conical portions respectively extending substantially to the discharge and charging ends of the furnace, a cooling system within said shell comprising at least one cooling conduit arranged adjacent to the inner surface of said shell but spaced therefrom, said cooling system extending at least over the entire longitudinal section of said shell adapted to retain the molten material treated in said furnace, the exterior surfaces of said cooling conduit and the interior surface of the shell over which the cooling system extends being directly covered solely with a coherent protective layer of solidified material derived from the material treated in the molten phase in said furnace, means for supplying a cooling liquid to the cooling conduit to maintain said solidified protective layer in solidified condition, said means including a stuffing box, the discharge end of said shell being of smaller cross-section than the remainder of such shell and the stuffing box being situated at the discharge end of the shell.

References Cited in the file of this patent

UNITED STATES PATENTS

| 175,624 | Pierce | Apr. 4, 1876 |
| 241,515 | Siemens | May 17, 1881 |
| 391,735 | Bullard | Oct. 23, 1888 |
| 500,387 | Hartman | June 27, 1893 |
| 682,365 | Mount | Sept. 10, 1901 |
| 853,698 | Hunter | May 14, 1907 |
| 1,005,396 | Wolle | Oct. 10, 1911 |
| 1,350,865 | Griffiths | Aug. 24, 1920 |
| 2,089,000 | Murray | Aug. 3, 1937 |
| 2,175,291 | Heskett | Oct. 10, 1939 |
| 2,280,571 | Dionesotti | Apr. 21, 1942 |
| 2,373,749 | Elkington | Apr. 17, 1945 |
| 2,480,359 | Debenham | Aug. 30, 1949 |
| 2,670,192 | Reintjes | Feb. 23, 1954 |

FOREIGN PATENTS

| 793,298 | France | Nov. 16, 1935 |

OTHER REFERENCES

Page 621 of Refractories by Norton, published 1949 by McGraw-Hill Book Co., Inc., New York.